United States Patent [19]
Rosenthal

[11] Patent Number: 5,069,076
[45] Date of Patent: Dec. 3, 1991

[54] LINEAR ACTUATOR

[75] Inventor: Dov Rosenthal, Tel Aviv, Israel

[73] Assignee: De Haan Mechatronics B.V., Musselkanaal, Netherlands

[21] Appl. No.: 388,978

[22] Filed: Aug. 3, 1989

[30] Foreign Application Priority Data

Aug. 4, 1988 [NL] Netherlands ............... 8801948

[51] Int. Cl.⁵ ............................................. F16H 27/02
[52] U.S. Cl. ........................... 74/89.15; 74/424.8 R; 264/318; 403/310
[58] Field of Search ......... 74/89.15, 424.8 R, 606 A; 403/309, 310, 290, 371; 29/456, 527.1, 527.2, 401.1; 264/318, 310, 271

[56] References Cited

U.S. PATENT DOCUMENTS

| | | | |
|---|---|---|---|
| 1,673,738 | 6/1928 | Dibner | 403/290 X |
| 2,366,747 | 1/1945 | Moody | 403/290 X |
| 2,511,479 | 6/1950 | Olah | 74/606 A X |
| 2,850,922 | 9/1958 | Welsh | 74/711 |
| 3,150,222 | 9/1964 | Blaustein et al. | 264/318 |
| 3,262,535 | 7/1966 | De Pasqua | 74/424.8 R |
| 3,592,070 | 7/1971 | Hammond | 74/424.8 R X |
| 3,646,185 | 2/1972 | Jennings | 264/318 X |
| 3,975,968 | 8/1976 | Chaffin | 74/424.8 R X |
| 4,337,671 | 7/1982 | Ulf | 74/89.15 X |
| 4,392,390 | 7/1983 | Johnson | 74/89.15 |
| 4,434,677 | 3/1984 | Linley, Jr. | 74/89.15 X |
| 4,553,056 | 11/1985 | Pfister | 310/80 |
| 4,598,238 | 7/1986 | Scarano | 74/424.8 R X |
| 4,614,128 | 9/1986 | Fickler | 74/89.15 X |
| 4,614,631 | 9/1986 | Daugny | 264/269 X |
| 4,760,759 | 8/1988 | Blake | 74/606 A X |
| 4,790,971 | 12/1988 | Brown et al. | 264/318 X |
| 4,859,394 | 8/1989 | Benton et al. | 264/318 X |

FOREIGN PATENT DOCUMENTS

| | | |
|---|---|---|
| 0121497 | 10/1984 | European Pat. Off. . |
| 0263578 | 9/1985 | European Pat. Off. . |
| 0191363 | 8/1986 | European Pat. Off. . |
| 7900553 | 5/1980 | Fed. Rep. of Germany . |
| 8001341 | 6/1980 | France . |
| 1300280 | 7/1988 | France . |
| 1302284 | 7/1988 | France . |
| 146955 | 8/1985 | Japan ................... 74/89.15 |
| 12094 | of 1893 | United Kingdom ........... 403/310 |
| 556 | of 1900 | United Kingdom ........... 403/310 |
| 4003 | of 1901 | United Kingdom ........... 403/310 |
| 3049 | of 1908 | United Kingdom ........... 403/310 |
| 2056931 | 3/1981 | United Kingdom . |

OTHER PUBLICATIONS

Bush, F. E., "Coupling Means for Driving a Caddy Along Curved Paths", Mar. 14, 1984, sheet 1 of 1.

*Primary Examiner*—Dwight Diehl
*Attorney, Agent, or Firm*—Dennison, Meserole, Pollack & Scheiner

[57] ABSTRACT

A linear actuator is provided with a cylindrical bore with internal screw thread and accommodated therein a screw means with external screw thread connected to a rod. By turning these parts with respect to each other, a linear movement of the rod can be obtained. The internal space in the housing is sealed to the outside, and preferably filled with a liquid lubricant. Also, there is a space outside the bore which is connected to the space inside the bore and which is at least partially bounded by a resilient, flexible wall part for compensating volume changes in the bore due to the linear movement of the rod.

13 Claims, 5 Drawing Sheets

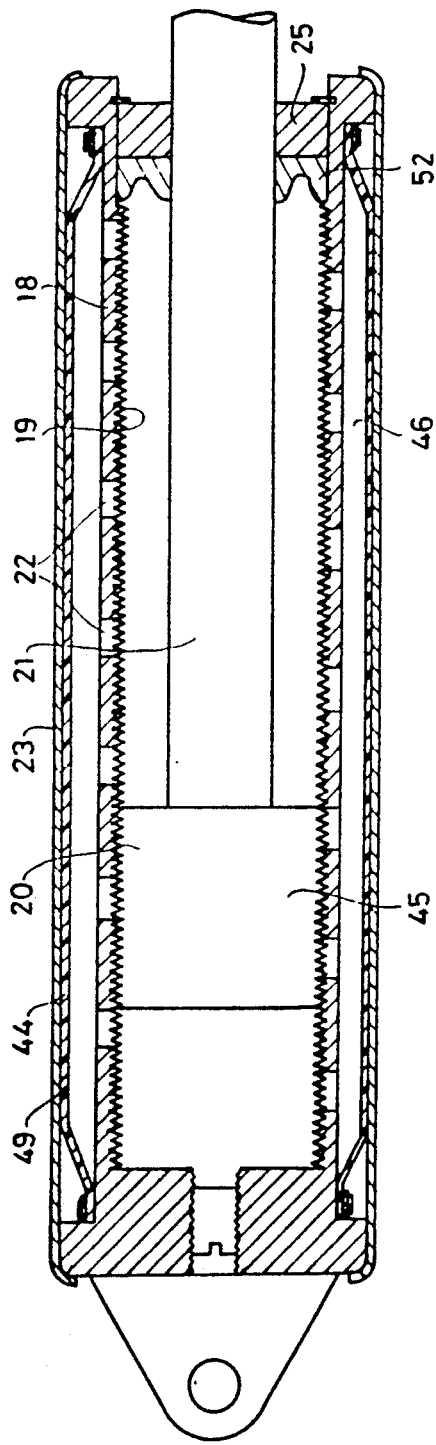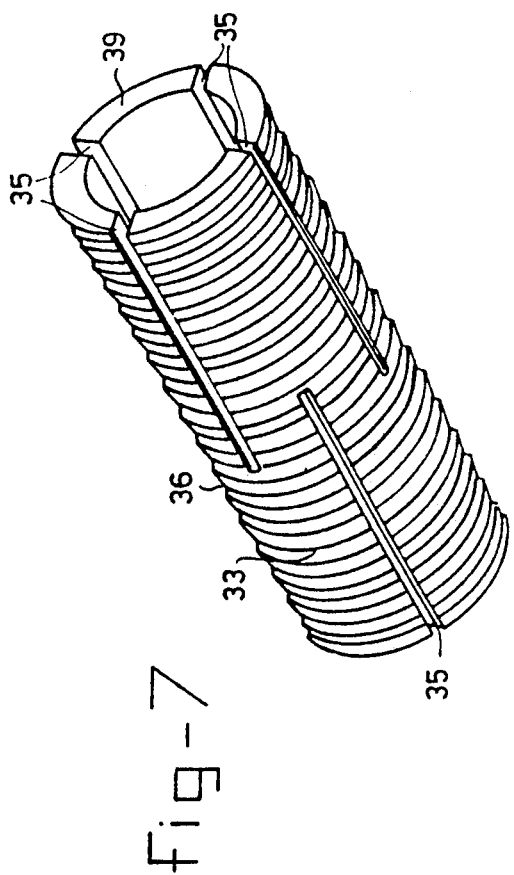

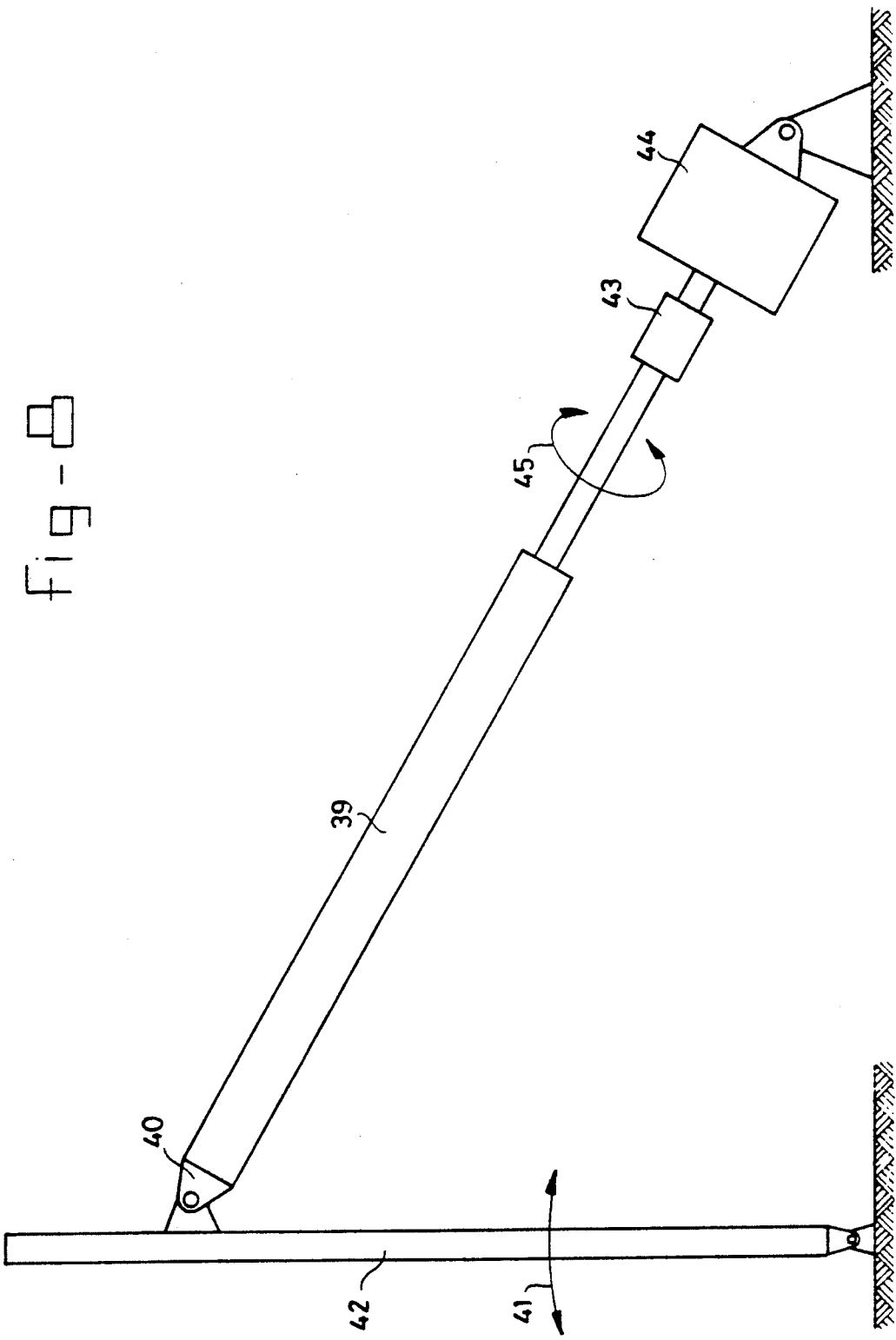

LINEAR ACTUATOR

The invention relates to a linear actuator, in other words a control mechanism which can move two points of a structure in a linear manner towards and away from each other, and to a process for the production of the housing of said actuator.

Many types of such linear actuators are known, for example hydraulic, pneumatic and mechanical, the last-mentioned, for example, with a screwed rod in a nut. The object of the invention is to produce a simple linear actuator which is easy to operate, for example by means of an electric motor connected directly thereto, is simple in design, and can easily be permanently lubricated to ensure smooth running and a long service life, without wear.

For this purpose such an actuator according to the invention is characterized in that it has a cylindrical housing with cylindrical bore with internal screw thread and accommodated therein a screw means with external screw thread, in engagement with said screw thread in the housing, so that through turning of one of these parts relative to the other an axial displacement relative to each other also takes place, while the screw means is connected to a rod extending beyond the housing, and housing and rod have means for connecting them to parts which can be moved in linear fashion relative to each other, and to means for rotation of rod and housing relative to each other for obtaining the linear movement.

The space in the housing preferably forms part of a space which is sealed to the outside, and it contains a liquid lubricant. There is then no need to lubricate with grease because oil could flow away out of the actuator, and such greasing would require frequent maintenance and replenishment.

When the rod projects from the housing at only one end the seal of the housing to prevent oil from flowing away at one end is no problem, and only a stuffing box or similar seal need be provided at the other end, where the rod is projecting from the housing.

The whole volume to be filled by the lubricant inside the housing then changes, of course, depending on the axial position of the nut therein, because the piston rod at one side of the nut takes up a varying volume in the housing.

For this reason it is proposed according to the invention that the space sealed off to the outside should contain at least one space outside the bore, said space being connected to the space inside the bore by apertures in the wall of the housing.

With a good design the interior of the housing can then always remain completely full of lubricant, and if these apertures and this space outside the housing lie high enough, no air can penetrate into the housing.

In order to be independent of position and placing of the parts, it is better in a preferred embodiment according to the invention to bound said space outside the bore at least partially by a resilient, flexible wall part. This wall part can keep the lubricant constantly under some excess pressure and can adapt to the volume of the lubricant which has to flow out of or into the housing without air being able to enter the housing.

This flexible wall part can be a hose-type part lying all the way round the housing and bounding said space outside the housing on the outside. There are, however, disadvantages to this, inter alia because said flexible wall part is fragile and thus itself has to be protected and gives great heat insulation, so that the actuator is not properly cooled and can become disadvantageously hot.

A particularly attractive embodiment in which these disadvantages do not occur is that in which the housing has one or more protuberances, each of which forms such a space outside the bore, and which have a rigid outside wall, while an elastic, flexible element is disposed in said space, filled with fluid and surrounded on the outside by the lubricant in said space inside the protuberance.

If a gas is selected for this fluid, the flexible element can be closed. Depending on the volume changes in the lubricant inside the bore, the gas in the flexible element is compressed to a greater or lesser extent.

The flexible element, preferably designed as a long hose in the lengthwise direction of the housing, now lies well protected inside a fixed wall of the protuberance on the housing, can be small in cross-section and very strong, and can have a long service life, while the normal wall of bore and protuberance made of metal conducts heat well and thus can remain cool, if desired with improved cooling action through external cooling fins.

It is preferable to make provision for the hose to be sealed at one end and connected to the environment at the other end. The environment here can be the outside air, but it can also be water.

When the hoses are compressed during retracting of the rod, the air (or water) in the interior of the hoses can escape. This prevents pressure increase of the type which would occur in fully closed, gas-filled hoses. The result of this again is that the behaviour of the actuator over the entire stroke range of the rod is constant, and thus is not influenced by pressure variations which could occur in closed, gas-filled hoses.

Cooling fins can be provided in the housing in order to improve the cooling. These fins preferably run parallel to the axis of the bore. In that case the housing can be formed in one piece through extrusion.

In particular in the embodiment in which the actuator is filled with a liquid lubricant it is ensured that wear on the screw threads is slight. Nevertheless, in order still to be able to compensate for any wear which may occur, which is important in connection with the positioning accuracy of the actuator, provision is made for the screw means to be divided partially or fully by one or more transverse incisions, in which case a threaded screw engages in one axial part of the screw means and under pressure pushes against another part of the screw means which is separated by said transverse incision(s) from the first-mentioned axial part thereof, or against the rod fixed to said other part and extending beyond the housing, in order to be able to vary the axial distance of the screw means parts slightly for setting the clearance of the screw means in the screw thread of the bore.

In order to obtain the rotation of housing and nut relative to each other, an electric motor is provided on and around said rod or in line therewith. The electric motor can be supported here by a fixed structural part, while the end of the housing facing away from the electric motor is coupled to a structural part to be displaced by the actuator.

For coupling of the rod to, for example, the drive shaft of an electric motor, provision is made for the rod to be coupled to an extension piece by a sleeve enclosing the rod and having running therein from both ends radially throughgoing slits, said extension piece engaging in the other end of the sleeve, while nuts round the externally threaded sleeve grip the sleeve on the rod and on the extension piece.

The accuracy of the actuator also depends on the accuracy with which the screw threads can be manufactured. The internal screw thread in the bore in particular deserves attention here. It is known to provide the screw thread herein using a lathe. The cutter or the journal tool here has to be mounted on the end of a support which can be fitted in the bore. Such a cutter support is not ideal, so that the accuracy of the screw thread cut therewith cannot be great.

An improvement can also be obtained in this respect according to the invention through the fact that for the production of an internally threaded housing the latter is provided with a bore with a diameter which is greater than that of the root of the tooth, a mandrel is disposed coaxially in the bore and provided externally with the negative form for the internal screw thread to be produced, a fluid, curable composition is then poured into the space between mandrel and bore wall, and the composition is cured, after which the mandrel is removed by unscrewing.

The mandrel can be worked very accurately in the known manner for the production of its external screw thread, which forms the negative of the desired internal screw thread. The internal screw thread obtained during moulding is therefore correspondingly accurate.

For the substance it is preferable to use a plastic, for example an epoxy resin, which is readily mouldable and after curing has a low coefficient of friction of the surface and is very dimensionally stable. The difference from the housing in coefficient of expansion can be slight, and good cooling of the housing can keep stresses between housing and resin so small that no problems occur through a difference in expansion.

The admissible stresses of the plastic are generally lower than those of the metal used for the screw means. In order then to obtain an actuator with the greatest possible strength, the ratio of the dimensions of the screw teeth of screw means and housing along the axis thereof can be other than one and approximately inversely proportional to that of their admissible material stresses.

The invention will be explained below with reference to the figures.

FIG. 3 shows a cross-section through a second embodiment.

FIG. 7 shows a coupling sleeve.

FIG. 8 shows an example of an application of the actuator.

Figure 1:
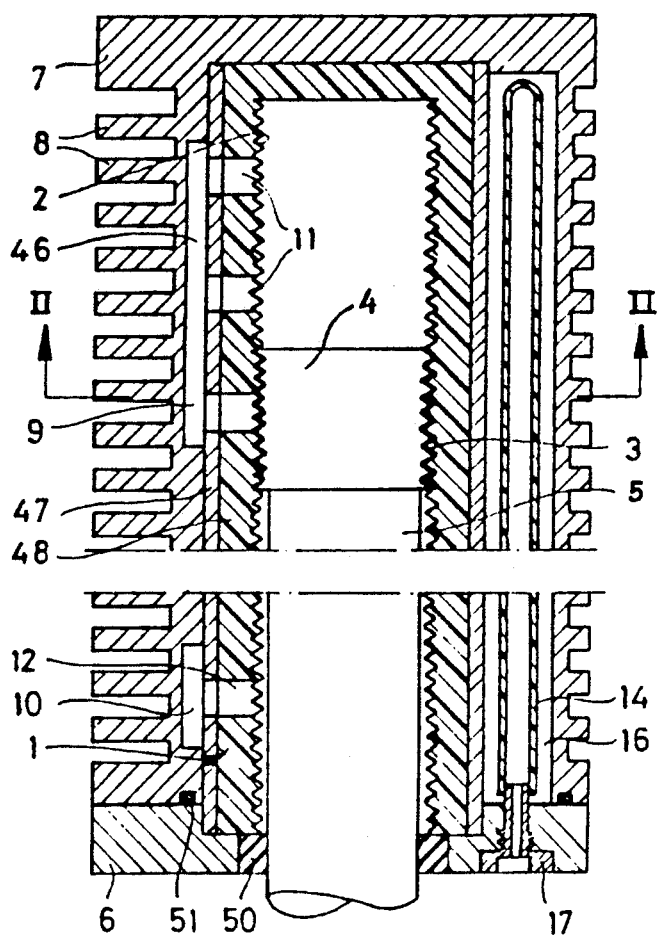
FIG. 1 shows a cross-section of a first embodiment of the actuator along line I—I of FIG. 2.
Figure 2:
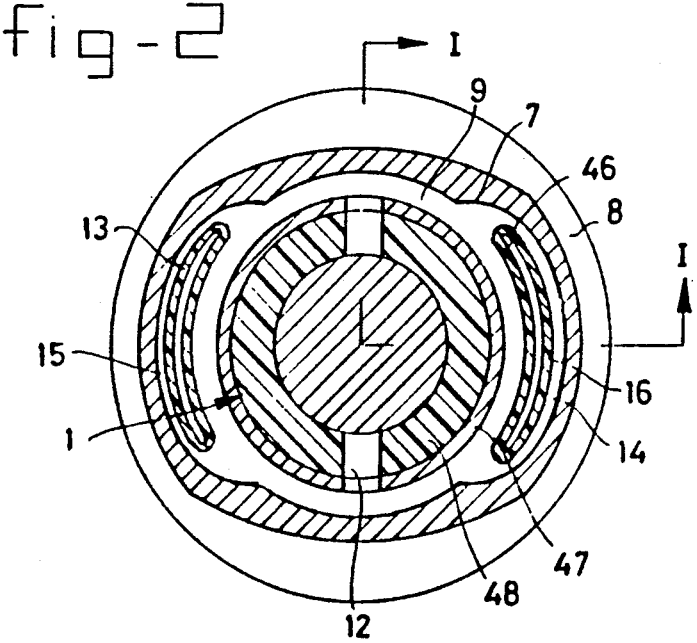
FIG. 2 shows a cross-section along line II—II of FIG. 1.

The actuator shown in FIGS. 1 and 2 has a housing 1, comprising a tube 47 and a sleeve 48 which is provided internally with screw thread 2 and which can be made of, for example, plastic. The screw thread 3 of the rod 4 in the housing 1 is in engagement with this screw thread 2. As shown, if the sleeve 48 is made of plastic, the thread 2 of said sleeve can have thicker teeth than the thread 3 of the metal sleeve. The diameter of the unthreaded part 5 of the rod 4 is slightly smaller than the internal diameter of the screw thread 3, so that by turning housing 1 and rod 4 relative to each other they can be displaced relative to each other in the lengthwise direction. Rod 4 is conveyed via stuffing box 50 through cover 6 out of the housing 1 to the outside. The whole space bounded by housing 1 and rod 4 is filled with a liquid lubricant 46, so that lubrication is always ensured. Cover 6 is fixed to case 7 by means of bolts (not shown); the seal is ensured here by stuffing 51.

The diameter of the unthreaded part 5 of rod 4 is preferably selected as large as possible. In this way the greatest possible stability of the rod as regards buckling and vibrations is obtained.

Oil containing molybdenum sulphide is preferably used as the lubricant. Here a layer of molybdenum sulphide forms on the screw thread surfaces, as a result of which direct contact between the mating screw thread surfaces is avoided.

Figure 1A:
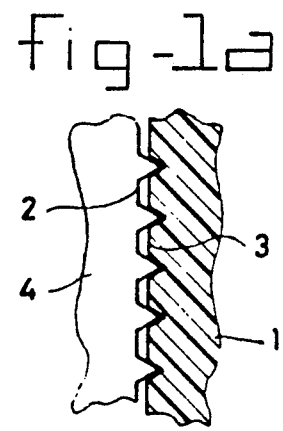
FIG. 1a shows a screw thread variant.

In the variant shown in FIG. 1a the screw thread of the plastic housing is designed with thicker teeth than the screw thread of the rod.

The housing 1 is also enclosed by a case 7 which is provided on the outside with cooling fins 8. The housing 1 lies with its exterior closely against the interior of the case 7, with the exception of the place where channels 9, 10 are located in said interior. At the same level as these channels the housing 1 is provided with holes 11, 12, so that during displacements of the rod 4 in the housing 1 the lubricant can flow through these holes 11, 12 into or out of the channels 9, 10. The channels 9, 10 are also connected to the protuberances 13, 14 which run in the lengthwise direction of the case, and which can receive the lubricant forced out of the housing 1. The hoses 15, 16 in said protuberances are pressed flatter in the process. At one side the hoses 15, 16 are connected to nipples 17, so that the air can escape from the inside of the hose.

Conversely, the air can flow back into the inside of the hose when the rod 4 is moved out of the housing 1, and therefore the lubricant flows back into the housing 1.

The end parts of the housing 1 have no holes for making the lubricant flow away or flow in. This has the advantageous effect that when the rod 4 is moved in or out so far that the screw thread part 3 reaches one of these areas, the movement of housing 1 and rod 4 relative to each other is gradually slowed down.

The actuator shown in FIG. 3 also has a housing 18 with internal screw thread 19 by means of which the screw thread 20 on the nut 45 in the housing 18 is in engagement with rod 21. Housing 18 is provided along virtually its entire length with holes 22 which are intended to allow through the lubricant 46 between the housing 18 and the elastic bellows 49 enclosing it. The bellows 49 is protected on the outside by case 23, which is not itself in contact with the lubricant. Depending on the displacement movements of the rod 24 on which the nut 21 is fitted, the bellows 49 expands to a greater or lesser extent to take the lubricant in the space between the sides of bellows 49 and housing 18 facing each other. The rod 21 is conveyed to the outside via stuffing box 52 and cover 25.

Figure 4:
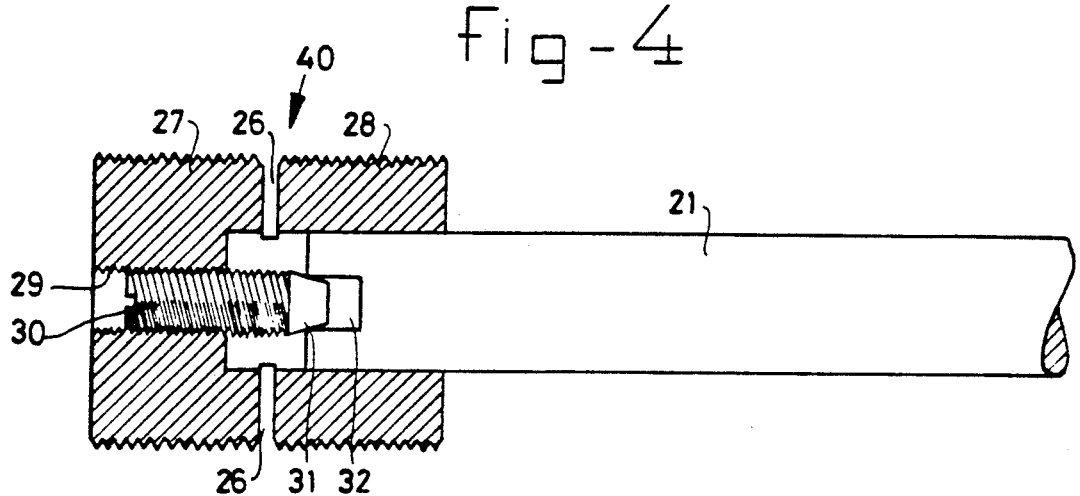
FIG. 4 shows a cross-section of the nut.
Figure 5:
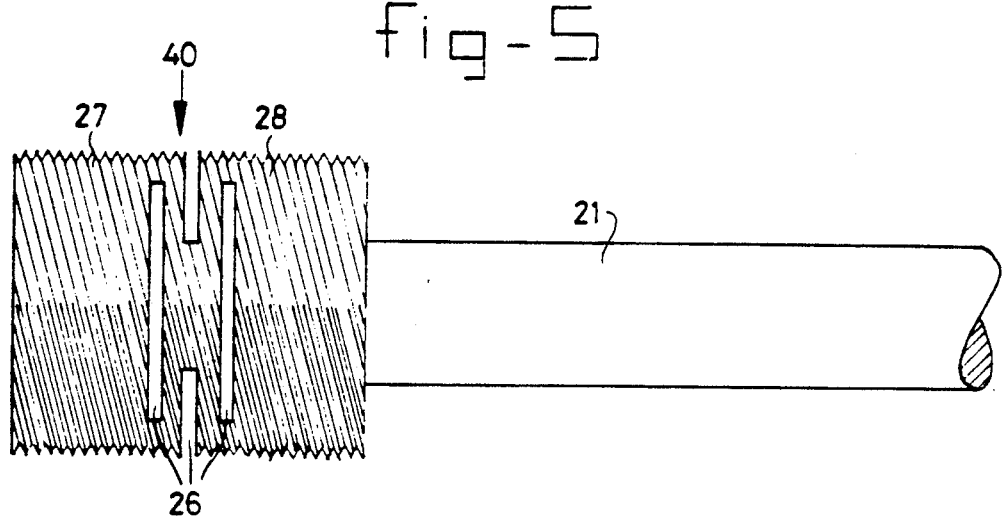
FIG. 5 shows a view of the nut of FIG. 4.

FIGS. 4 and 5 show a possible embodiment of the nut 40, in which there can be compensation for any play caused by wear and manufacturing tolerances and inaccuracies of the screw threads. This embodiment has slits 26 running partially over the periphery. This means that the two half nuts 27, 28 located on either side of the slits 26 can be moved axially relative to each other to a limited degree. In order to obtain this relative movability of half nuts 27, 28, half nut 28 is fixed on the rod 21. Screwed into hollow 29 is an adjusting screw 30 which projects with its tapering end 31 into the slit 32 disposed in the end face of the rod 21. Depending on the setting of this adjusting screw 31, the half nut 27 is pushed to a greater or lesser extent away from the half nut 28. The nut 40 could also be divided completely by a slit 26, and means would, of course, then have to be present to connect the part of the nut not present on the piston rod to the other part in an axially movable manner, for example y means of sliding pins all the way round and outside the shaft.

Figure 6:
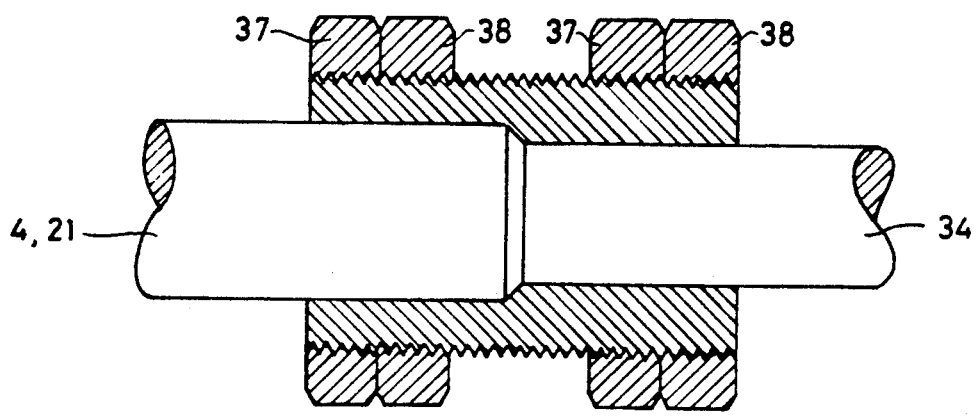
FIG. 6 shows an embodiment of a coupling.

FIGS. 6 and 7 show a possible coupling sleeve 33 intended for connecting the rod 4, 21 to an extension piece (or motor shaft) 34. The sleeve is provided at both ends with axial-running slits 35. The sleeve lies clear of the external diameter of the rod or shaft to be coupled. The internal diameter of the sleeve is slightly larger than the external diameter of the rod or shaft to be coupled, so that it can be easily pushed over it. Nuts 37, 38 are disposed on the external screw thread 36 of said coupling sleeve. By tightening these nuts 37, 38 well, in pairs respectively, towards each other, a force directed radially inwards is exerted on the lips 39 formed between the slits 35, due to the slope of the tooth flanks. These lips are therefore pressed forcefully inwards, so that they clamp the rod 4, 21 and 34 respectively.

FIG. 8 shows a possible application of the actuator 39. The actuator 39 is fixed at one side, by means of a fitting 40 fitted on its case, to an element 42 which will be moved to and fro in the direction of arrow 41, and at the other side is fixed, by means of a coupling device 43 such as that of FIGS. 6 and 7, to a hingedly suspended electric motor 44. By turning the electric motor to and fro in the direction of arrow 45, an appropriate extension or shortening of the actuator 39 is obtained, so that element 42 can be moved to and fro over the desired distance.

Figure 9:
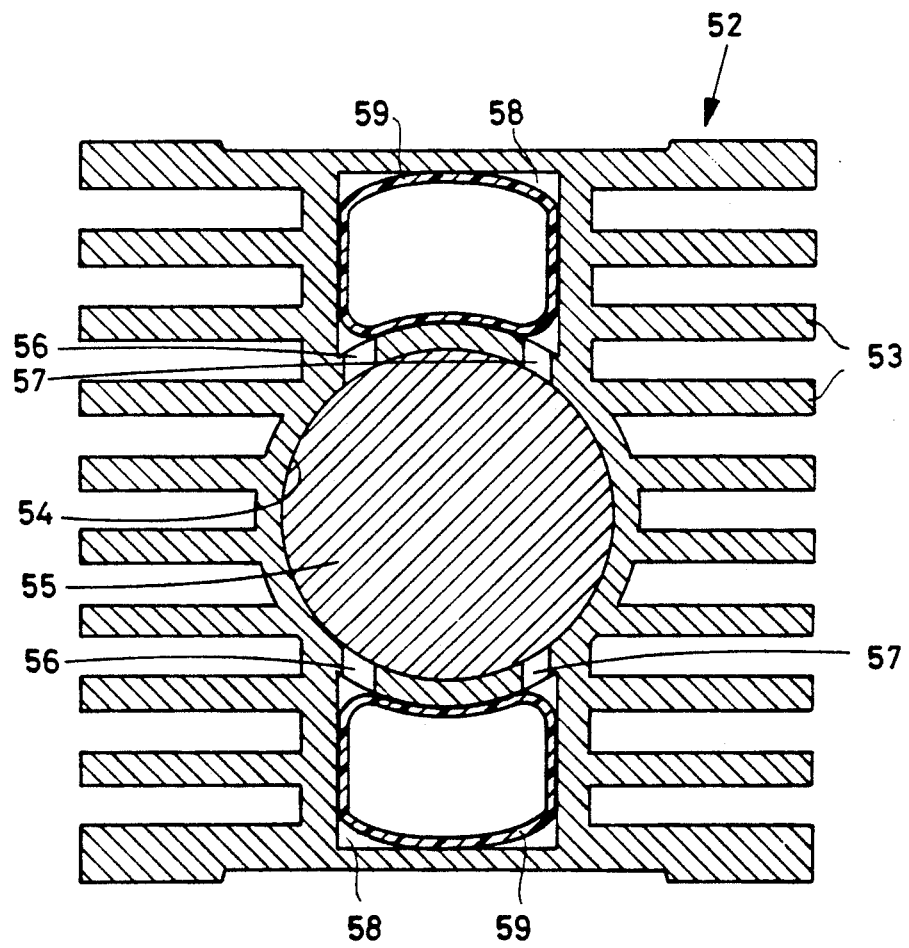
FIG. 9 shows a cross-section through a third embodiment.

In the third embodiment shown in FIG. 9 housing and case are integral in the form of an extruded section 52. Cooling fins 53 running in the lengthwise direction are disposed thereon on the outside. The bore 54 is provided internally with screw thread which can mate with the externally threaded screw means 55. The bore 54 is also connected by means of holes 56, 57 to the protuberances 58 in which the flexible hoses 59 are located. The holes 56, 57 of a protuberance lie as far as possible apart, in such a way that both holes 56, 57 cannot be shut off at the same time by the hose 59 through the backflow of the lubricant.

I claim:

1. A linear actuator comprising a housing with cylindrical bore with internal screw thread means and accommodating therein a screw means with external screw thread means in engagement with said screw thread in the housing, whereby through turning of one of these parts relative tot he other an axial displacement relative tot each other also takes place, the screw means being connected to a rod extending beyond the housing, the housing and rod having means for connecting them to parts which can be moved in linear fashion relative to teach other, and to means for rotation of rod and housing relative to each other for obtaining the linear movement, a space in the housing forming part of a space which is sealed to the outside and adapted to contain a liquid lubricant, and wherein the space sealed to the outside contain at least one space outside the bore, said space outside the bore being connected to the space inside the bore by apertures in the wall of the housing.

2. Actuator according to claim 1, in which said space outside the bore is at least partially bounded by a resilient, flexible wall part.

3. Actuator according to claim 2, in which the housing has at least one protuberance which forms such a space outside the bore, and which have a rigid outside wall, while an elastic, flexible element is disposed in said space, filled with fluid and surrounded on the outside by the lubricant in said space inside the protuberance.

4. Actuator according to claim 3, in which the elastic, flexible element is closed and filled with gas.

5. Actuator according to claim 4, in which said elastic, flexible element is a hose extending in the lengthwise direction of the bore though the at least one protuberance.

6. Actuator according to claim 3, in which said elastic, flexible element is a hose extending in the lengthwise direction of the bore through the protuberance.

7. Actuator according to claim 6, in which said hose is closed at one end and is connected to the environment at the other end.

8. Actuator according to claim 1, in which the housing has external cooling fins.

9. Actuator according to claim 8, in which the fins run at right angles to the axis of the bore, and the at least one protuberance extends to near the external periphery of the cooling fins, but does not project beyond it.

10. Actuator according to claim 8, in which the cooling fins run parallel to the axis of the bore.

11. Actuator according to claim 1, in which the screw means is divided partially or fully by one or more transverse incisions, while a threaded screw engages in one axial part of the screw means and under pressure pushes against another part of the screw means which is separated by said transverse incision(s) from the first-mentioned axial part thereof, or against the rod fixed to said other part and extending beyond the housing, in order to be able to vary the axial distance of the screw means parts slightly for setting the clearance of the screw means in the screw thread of the bore.

12. Actuator according to claim 1, in which for turning the rod relative to the housing an electric motor is disposed on and around siad rod or in line therewith.

13. Actuator according to claim 1, in which the rod is coupled to an extension piece by a sleeve enclosing the rod and having running therein from both ends radially throughgoing slits, said extension piece engaging in the other end of the sleeve, while nuts round the externally threaded sleeve grip the sleeve on the rod and on the extension piece.

* * * * *